United States Patent
Nishi et al.

[11] Patent Number: 5,534,327
[45] Date of Patent: Jul. 9, 1996

[54] POWDERED LEATHER AND METHOD OF PRODUCING THE SAME

[75] Inventors: Tohru Nishi; Yasuji Kawamura, both of Ichihara; Kazuo Minato; Nobuo Kusamoto, both of Tokyo; Haruki Kai; Kazuhisa Kaneda, both of Ichihara; Takao Inokuchi, Tokyo, all of Japan

[73] Assignee: Idemitsu Petrochemical Co., Ltd., Tokyo, Japan

[21] Appl. No.: 169,747

[22] Filed: Dec. 17, 1993

Related U.S. Application Data

[63] Continuation of Ser. No. 697,763, May 9, 1991, abandoned.

[30] Foreign Application Priority Data

May 11, 1990 [JP] Japan ................................. 2-122001
May 11, 1990 [JP] Japan ................................. 2-122002

[51] Int. Cl.⁶ ........................................................ B32B 5/16
[52] U.S. Cl. ........................... 428/151; 428/323; 428/402; 428/904
[58] Field of Search ............................... 428/15, 22, 323, 428/402, 407, 151, 904

[56] References Cited

U.S. PATENT DOCUMENTS

| | | | |
|---|---|---|---|
| 4,834,762 | 5/1989 | Nishibori | 8/94.1 R |
| 5,100,707 | 3/1992 | Nishibori | 428/15 |

FOREIGN PATENT DOCUMENTS

| | | | |
|---|---|---|---|
| 63-099298 | 4/1988 | Japan. | |
| 63-156552 | 6/1988 | Japan. | |
| 63-233828 | 9/1988 | Japan. | |
| 63-286499 | 11/1988 | Japan. | |
| 1-163216 | 6/1989 | Japan. | |
| 1163215 | 6/1989 | Japan | C08J 3/20 |
| 1-197599 | 8/1989 | Japan. | |
| 1-314789 | 12/1989 | Japan. | |
| 295459 | 4/1990 | Japan | B02C 23/06 |
| 2184354 | 7/1990 | Japan | B02C 19/00 |

*Primary Examiner*—D. S. Nakarani
*Assistant Examiner*—H. Thile
*Attorney, Agent, or Firm*—Flynn, Thiel, Boutell & Tanis

[57] ABSTRACT

A powdered leather which is composed of at least 85% by weight of cortex, at most 2% by weight of oil and fat, and at most 0.5% by weight of $Na^+$ and $Ca^{2+}$ ions capable of being eluted by water and which has an average particle size ($D_{50}$) of at most 7 μm, a standard deviation of the average particle size being at most 3 μm. With this powdered leather, it is possible to thin films, coatings, fibers, etc. which would hardly be deteriorated with time. The powdered leather is produced by providing a powdered leather raw material, grinding the raw material into coarse particles, drying the coarse particles, defatting the dried coarse particles using a solvent, removing the residual solvent from the defatted coarse particles, rinsing the resultant coarse particles, dewatering the rinsed coarse particles, swelling the dewatered coarse particles in steam, redrying the swelled coarse particles, pulverizing the redried coarse particles, classifying the pulverized particles into fine powder and coarse powder, and repulverizing the fine powder so as to have an average particle size ($D_{50}$) of at most 7 μm.

4 Claims, 7 Drawing Sheets

POWDERED LEATHER AND METHOD OF PRODUCING THE SAME

This application is a continuation of U.S. Ser. No. 07/697,763, filed May 9, 1991, now abandoned.

BACKGROUND OF THE INVENTION

1. Field of the Invention

This invention relates to a powdered leather and a method of producing the powdered leather, and more particularly to a powdered leather which has an ultra-small particle size and contains few impurities and a method of producing the last-named powdered leather. The powdered leather is useful when mixed in resin when manufacturing various products such as coating (paint), leather (synthetic leather or artificial leather), film, sheet, fibers and moldings.

2. Description of the Related Art

In the manufacture of natural-leather-like articles such as coatings, films, sheets or fibers (yarns), it has hitherto been customary that a powdered leather is mixed in resin, and then this mixture is coated over a substrate or is molded. In the past, the powdered leather to be used was produced by grinding a powdered animal leather raw material such as shapings into coarse particles using a grinding means such as a hammer crasher.

However, with this simple mechanical grinding means, since the powder particles tend to stick to one another to form relatively massive or fibrous lumps, only coarse grains could be obtained. If the particle size of the powdered leather is large, various restrictions (e.g., the thickness of a coating, sandy touch of the surface and breakage of a yarn) would be inevitable in various applications, constituting obstacles to manufacturing.

To this end, various solutions have been proposed which are exemplified by the following: Japanese Patent Laid-Open Publication No. 63-156552/1988 discloses a method in which the powdered leather raw material ground into coarse particles is swollen in steam (hereinafter called "steam-boiling"), whereupon the swelled coarse particles are dried and then pulverized. Japanese Patent Laid-Open Publication No. 63-99298/1988 discloses an apparatus in which the powdered leather raw material is ground into coarse particles, whereupon the coarse particles are boiled, dried, pulverized and classified. Japanese Patent Laid-Open Publication No. 63-286499/1988 discloses a method in which the powdered leather raw material is defatted using a solvent, whereupon the resulting raw material is steam-boiled, dried and pulverized. Practically, in Japanese Patent Laid-Open Publication No. 63-233828/1988 the thus obtained fine particles are used in a molded product as fine powder of at most 40 μm size. Further, in Japanese Patent Laid-Open Publication No. 1-314789/1989 the fine particles are used in a synthetic leather as fine powder of at most 30 μm particle size.

According to the foregoing method, the fine particles include those having a particle size of at least 10 μm and are hence unsuitable to be mixed in a thin film, a coating or fibers. Specifically, a thin film generally requires a particle size of 5 to 200 μm. A synthetic leather in which a synthetic resin layer containing the powdered leather is coated over the surface of a substrate requires a particle size of 5 to 30 μm. Coating and fibers generally require a particle size of at most 10 μm, preferably as small as possible.

Conventionally, no consideration has been made about impurities except collagen usually contained in leather, for example, concerning amounts and kinds; while a finished product manufactured using the foregoing powdered leather is used or stored for a long time period, impurities would be bled out to the surface as influenced such as by humidity and heat, thus deteriorating the appearance and the anti-discoloration properties of the product.

It is therefore an object of this invention to provide a powdered leather which is suitable for use when manufacturing a thin film, a coating, fibers, etc. and which can reduce deterioration of the appearance and properties of a finished product, thus providing an improved degree of durability.

Another object of the invention is to provide a product manufactured using the powdered leather described above.

Still another object of the invention is to provide a method of producing the powdered leather described above.

SUMMARY OF THE INVENTION

According to a first aspect of the invention, there is provided a powdered leather which is composed of at least 85% by weight of hide, at most 2% by weight of oil and fat, and at most 0.5% by weight of $Na^+$ and $Ca^{2+}$ elutable by water and which has an average particle size ($D_{50}$) of at most 7 μm, a standard deviation of the average particle size being at most 3 μm.

Following are reasons why the property values of the individual constituent components of the powdered leather are defined:

1) At least 85% by weight of hide:
The large content of the hide means that the amount of impurities is small and also means that it is a significant factor for improving the surface condition or tactile quality of a finished product. If the content of the hide is large, it is possible to improve the surface condition or tactile quality of a finished product effectively with only a small amount of powder.

1) At most 2% by weight (preferably 0.5% by weight) of oil and fat:
Oil and fat existing in an animal leather change in quality by factors as heat, and this quality change can cause offensive odor, color change, and tactile quality deterioration (greasy, slimy or shiny touch) of a compound product. Therefore, the content of oil and fat is preferably as small as possible.

3) At most 0.5% by weight of free ions ($Na^+$ and $Ca^{2+}$) elutable by water:
If the amount of free ions eluted by water is large in the impurities originally existing in the leather raw material, their salts (e.g., NaCl, $Na_2SO_4$ or $CaSO_4$) would be bled out to the surface of a product under the influence of humidity or heat, thus deteriorating the appearance of tile product. There exist, as free ions, not only positive ions $Na^+$ and $Ca^{2+}$ but also negative ions $Cl^-$ and $SO_4^{2-}$; however, because what bleed out is only in the form of salt of the opposite ions, the amount of positive ions $Na^+$ and $Ca^{2+}$, which is small was defined.

4) Average particle size $D_{50} \leq 7$ μm and Standard deviation $\sigma \leq 3$ μm
The particle size is a determinant factor to a thin product; if the particle size is large, it causes fault and tactile quality deterioration due to the poor particle dispersion (granular or rough touch). Meanwhile, the smaller the particle size, the better the particle dispersion obtained so that a product having only a few faults (void, breakage of yarns, etc.) can be obtained. A small standard deviation means that only a few large particles are mixed.

These individual property values are measured in the following methods:

A) Hide and oil and fat:

The method according to JIS (Japanese industrial Standard) K6550-1976 "leather testing method" 6.7 and 6.4 was used.

B) Total amount of free ions ($Na^+$ and $Ca^{2+}$) elutable by water:

10 g of dry powdered leather were stirred in 100 ml of pure water for one day and night to elute free ions from the powdered leather. $Na^+$ and $Ca^{2+}$ ions in the eluted solution were measured by an atomic spectrum method to find as an amount of elution from the powdered leather.

C) Distribution of average particle size and standard deviation:

Several tens mg of powdered leather were dispersed in 100 ml of methanol, and distribution of the particles was measured by a coal tar counter (manufactured by Coal Tar Electronics Inc.) to find an average particle size and a standard deviation.

The range of density of the powdered leather is usually 0.38 to 0.43 g/cc (measured according to JIS k6721 after drying the powdered leather at 120° C. for two hours). If the density is excessively large, the particle size increases so as to exceed a predetermined average particle size of 7 µm. If the density is excessively small, the powdered leather would be fiberous and would include many ciliary portions so as to be difficult to uniformly disperse in synthetic resin.

According to the second aspect of the invention, there is provided a method of producing a powdered leather, comprising the steps of: providing a powdered leather raw material; grinding the raw material into coarse particles; drying the coarse particles; defatting the dried coarse particles using a solvent; removing the residual solvent from the defatted coarse particles; rinsing and dewatering the resultant coarse particles; swelling the dewatered coarse particles in steam; redrying the swelled coarse particles; pulverizing the redried coarse particles; classifying the pulverized particles into fine powder and coarse powder; and repulverizing the fine powder so as to have an average particle size ($D_{50}$) of at most 7 µm.

According to a third aspect of the invention, there is provided a finished product comprising: a powdered leather which is composed of at least 85% by weight of hide, at most 2% by weight of oil and fat, and at most 0.5% by weight of sum of free ions $Na^+$ and $Ca^{2+}$ elutable in water and which has an average particle size ($D_{50}$) of at most 7 µm, a standard deviation of the average particle size being at most 3 µm; and 10 to 99% by weight of synthetic resin, with respect to 90 to 1% by weight of the previously named constituent components of said powdered leather. The product may be in the form of a film or sheet. Alternatively the product may additionally comprise a substrate, the compound of the powdered leather and the synthetic resin being in the form of a film or sheet coated over the substrate to provide a laminate.

DETAILED DESCRIPTION OF THE PREFERRED EMBODIMENT(S)

Figure 1:
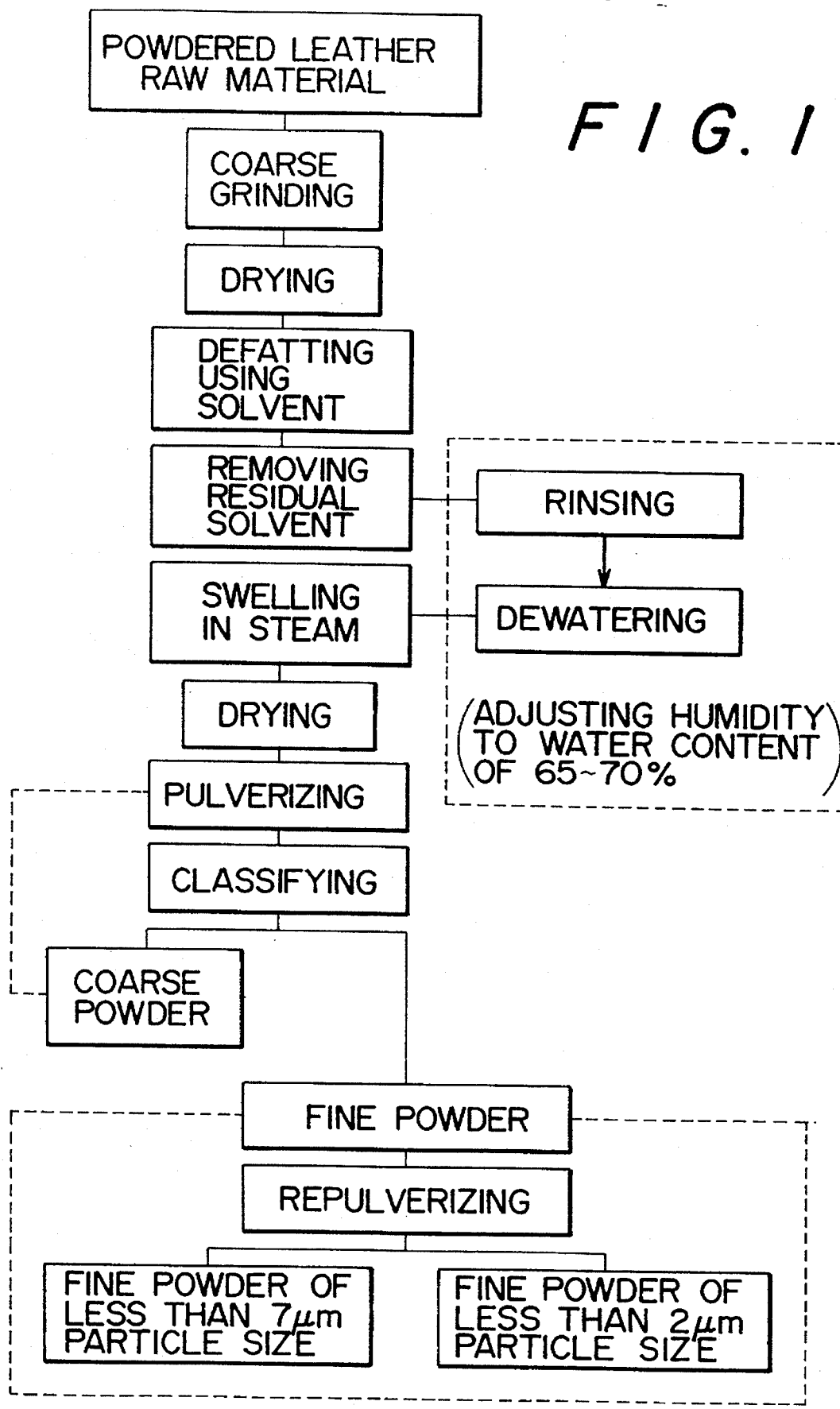
FIG. 1 is a flowchart showing the manner in which a powdered leather according to one embodiment of this invention is produced.

A method of producing the powdered leather will now be described in greater detail in connection with the flowchart of FIG. 1. Dotted-line frames in FIG. 1 indicate improved features of this method.

First of all, in order to facilitate a subsequent pulverizing step, a powdered leather raw material is ground into coarse particles of a particle size of at most about 10 mm by a grinding machine, such as a jerk crasher, a cutter mill or a hammer crasher. The coarse powder usually contains 40 to 60% by weight of water. The powdered leather raw material may be leather shavings or split leather.

Then in order to facilitate a subsequent defatting (removing oil and fat) step, this wet coarse powder is dried until its water content is about 20 to 30% by weight.

This dry coarse powder is defatted using a suitable solvent. The defatting solvent may be n-hexane, benzene, methylene chloride, acetone, ethyl acetate or toluene.

Subsequently, the defatted coarse powder is heated to remove the residual solvent from the coarse powder. Generally steam is used as a heat source for safety, and so this step is called "steam purge". Alternatively, the heat source may be heated nitrogen or heated air.

Then in order to facilitate a subsequent pulverizing step, free ions ($Na^+$ and $Ca^{2+}$) in the powdered leather are eluted and removed. And in order to hold a predetermined water content in the coarse powder, a rinsing step and a dewatering step are substituted for the conventional moisture controlling step. This combined washing operation is effective if repeated several times batch-wise; for example, a predetermined amount of water is supplied to the coarse powder from which the residual solvent has been removed, and the coarse powder is stirred for a predetermined time period and is, if necessary, treated with bubbles by air, whereupon the coarse powder is dewatered. This washing operation is repeated preferably three or four times. At that time, if an adequate amount of water is supplied to the coarse powder, the eluting coefficient would hardly be improved even when the washing operation is repeated five or more times. This eluting coefficient is as high as that when the washing is repeated either three or four times. The dewatering is usually performed by filtration (dripping or draining) for simplicity), but may alternatively be performed by centrifugal dehydration, for example.

The amount of water for each supply should preferably be seven or more times (weight) the coarse powder. If six or less times, the coarse powder cannot be adequately soaked in water so that only a poor eluting effect can be achieved. The more the amount of water, the more the amount of eluted ions for each batch washing, which is advantageous. Practically, however, since there are restrictions to the capacity of a rinsing vessel and the dewatering time period, it is more effective if the washing operation is repeated with minimum amount of water needed for soaking. Conducting the washing operation continuously requires an increased amount of water; therefore the continuous washing operation is not advantageous but may be performed.

The temperature of water may be room temperature and preferably 30° C. or below. Even if the temperature of water is increased to over 30° C., the eluting coefficient would hardly vary. On the contrary, if the elution is conducted a high temperature, it results in deterioration of collagen.

As a result of the foregoing combined washing operation, the coarse powder having at most 0.5% by weight of free ions $Na^{3O}$ and $Ca^{2+}$ and usually 65 to 70% by weight of water. In the prior art, the moisture controlling step is performed by supplying water to the coarse powder, after removing the residual solvent, until the coarse powder contains 65 to 70% by weight of water. In this invention, the coarse powder is kept usually in water content of 65 to 70% by weight as a result of this combined washing operation, thus requiring only confirmation of this water content and enabling omission of the moisture controlling step of the prior art.

The water content of the coarse powder is kept in a predetermined value for the following reason: Assuming that the coarse powder in dry condition is steam-boiled and then pulverized, it is difficult to pulverize the coarse powder into fine powder. If the water-containing and hence swelled coarse powder is steam-boiled, it is partly denatured and, when dried, it becomes tight and firm to facilitate grinding and pulverizing.

Then in order to facilitate the subsequent pulverizing step, the dewatered coarse particles is swelled in steam (steam-boiled) while stirring. This swelling process is conducted under the same conditions as those in the prior art, for example, at a steam temperature of 100° to 130° C. and a steam pressure of 1 to 2.5 kg/cm²G.

Subsequently in order to facilitate the subsequent pulverizing step, the swelled coarse particles are dried until their water content is at most about 3% by weight. This drying step is performed usually in combination of predrying by a dryer and redrying by a vacuum drying machine. These predrying and redrying steps are conducted under the same temperature conditions as those in the prior art, for example, at 90° to 100° C. and at 30° to 45° C. (vacuum drying), respectively.

Then in order to facilitate the repulverizing step, the dried coarse particles are pulverized into fine particles having an average particle size of about 50 μm by a dry-type pulverizing machine, such as a victory mill, a bowl mill, a colloidal mill, a jet mill, a roller mill or a hammer mill.

The resulting fine particles are classified into fine powder (e.g., having an average particle size $D_{50} \leq 30$ μm) and coarse powder (e.g., $D_{50} \leq 60$ μm) by a classifying machine, such as a gravity-type classifier, an inertia-type classifier, a centrifugal classifier (e.g., a cyclone and a micron separator), and a sieving machine. The coarse powder may be circulated to the pulverizing step at need.

These pulverizing step and classifying step by themselves are similar to those of the prior art. According to this invention, the method additionally includes a repulverizing step for further pulverizing the fine powder until $D_{50} \leq 7$ μm. Further, in order to uniform the particle size, another step may be added for classifying and removing the fine powder of $D_{50} \leq 2$ μm from the fine powder of $D_{50} \leq 7$ μm. The repulverizing step can be performed by a dry-type pulverizing machine such as a jet mill and colloidal mill, which are suitable for fine pulverization. The classifying step can be performed by the above-mentioned classifier.

In the foregoing method, the combined washing operation is performed after the defatting step. This combined washing operation nay be performed either before the defatting step or after the pulverizing step. If the combined washing operation is performed before the defatting step, a repellent defatting solvent repels water so that water hardly permeates the coarse particles. In the case of a hydrophilic solvent, the washing operation can be performed without difficulty. If the washing operation is performed after pulverizing step, water can be separated and removed from the fine particles only by a filter so that filtration is difficult to carry out, causing the fine particles to become hardened into a mass. If during the rinsing and filtering step after the pulverizing step, the dewatering and defatting steps are performed simultaneously by a volatile and high hydrophilic solvent, the filtration would be slightly facilitated, and drying would also be facilitated.

Figure 2A:
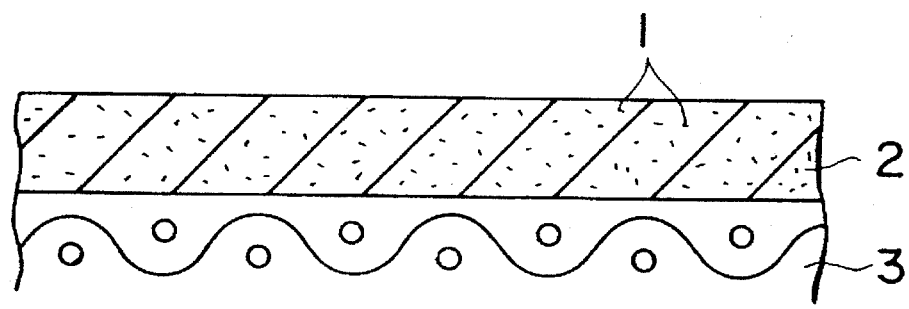
FIGS. 2(A), 2(B) and 2(C) schematically show products, i.e., leather (synthetic leather or artificial leather), coating (coating film) and fiber, respectively, manufactured using the powdered leather of the invention.
Figure 2B:
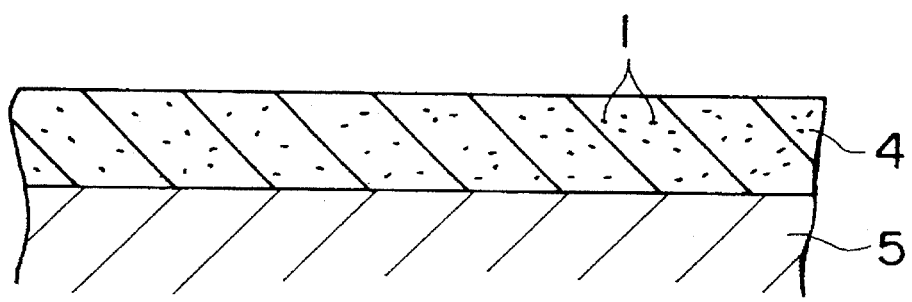
Figure 2C:
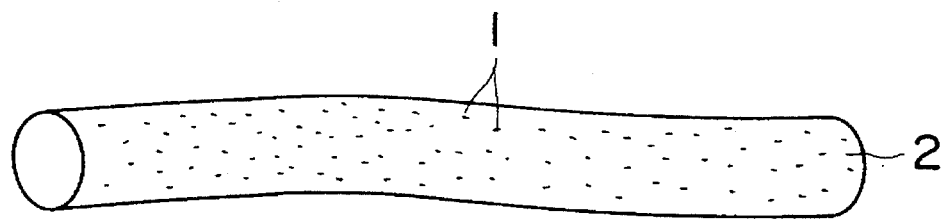

The ultra-fine powdered leather thus obtained are blended in a selected one of various kinds of resins after being predried. For example, as shown in FIG. 2(A), the powdered leather 1 of this invention is mixed in a synthetic resin 2, and this mixture is coated in a predetermined thickness over a substrate 3 such as a fabric to form a leather (synthetic leather or artificial leather). As shown in FIG. 2(B), a film of a predetermined thickness which the powdered leather 1 of the invention is blended and coated over the surface of a moldings 5. As shown in FIG. 2(C), a synthetic resin 2 in which the powdered leather 1 of the invention is blended is spun into fibers. The blending ratio of the resin and the powdered leather usually ranges from 10% by weight:90% by weight to 99% by weight:1% by weight.

Various products manufactures using the powdered leather of the invention will now be described.

I. Composition containing the powdered leather:

This composition comprises 1 to 90% by weight of powdered leather of the invention and 99 to 10% by weight of at least one selected from the group consisting of synthetic resin and rubber.

The synthetic resin to be used in the composition and other product may be a thermoplastic resin or a thermosetting resin. The thermoplastic resin is exemplified by vinyl chloride resin, vinyl acetate resin, polystyrene, ABS resin, acryl resin, polyethylene, polypropylene, fluorine resin, polyamide resin, acetal resin, polycarbonate, urethane or ester thermoplastic elastomer, cellulose plastics. The thermosetting resin is exemplified by phenol resin, urea resin, melamine resin, unsaturated polyester resin, epoxy resin, diaryl phthalate resin, thermosetting polyurethane resin or silicone resin.

The rubber is exemplified by diene synthetic rubbers (e.g., butadien-styrene or butadien-acrylonitrile), polysulfide synthetic rubbers (e.g., thiokol), polyolefin synthetic rubbers (e.g., ethylene-propylene or chlorosulfonic polyethylene), organic silicone compounds synthetic rubber, fluorine-containing compound synthetic rubber, urethanic synthetic rubber, vinyl synthetic rubber, and natural rubber.

To the composition of this invention, additives, such as oxidation retarder and U. V. absorber, fillers, improvers, vulcanizers, coloring agents, such as dye and pigment, and a solvent may be added according to the, purpose, such as for stabilization of quality, and the environment in which the product is to be used.

The oxidation retarder is exemplified by alkyl phenol, alkylene bisphenol, alkylphenol thioether, β,β'-thiopropionic acid ester, organic phosphorous acid ester, aromatic amine, and phenol-nickel composite.

The U. V. absorber is exemplified by salycylic acid ester such as phenyl salycilate, benzotriasol such as 2-benzotriasol such as 2-hydroxyphenylbenzotriazol, and hydroxy benzophenone such as 2-hydroxybenzophenone, 2-hydroxy-4-methoxybenzovenone, 2-hydroxy-4-octoxybenzophenone, 2,2'-dihydroxy-4-methoxybenzophenone.

For preventing bubbles and powder from being hydrolized when preheating or mixing the powdered leather with resin and rubber in pellet, powder, blocks or paste is used, the powdered leather having a water content of 0.5% by weight is mixed and stirred with resin and/or rubber, and an additive, if necessary, while heating. Thus they are processed into a pellet or powder form. To manufacture a liquid composition, resin and/or rubber is resolved or dispersed in an appropriate solvent, and then the powdered leather and, if necessary, an additive, are added to the resulting compound and are stirred and mixed therewith. In either ease, the mixing ratio of the powdered leather to synthetic resin and/or rubber ranges from 1 to 90% by weight of the powdered leather with respect to 99 to 10% by weight of synthetic resin and/or rubber. If the amount of the powdered leather exceeds 90% by weight, the composition becomes fragile; if the amount of the powdered leather is less than 1% by weight, there is no effect by the addition of the powdered leather.

From this composition, following products can be manufactured:

(1) Film, sheet:

The powdered leather is mixed in a commercially available synthetic leather blank (solution) containing, as solid part, 30 to 40% by weight of urethane resin. The resultant compound is coated over a separating-type paper by a coating device and is dried to form a film. The content of the powdered leather in this dried film is preferably 5 to 50% by weight.

Also, the powdered leather is mixed with vinyl chloride resin, and this mixture is then shaped into a sheet by calender molding or extrusion molding. The content of the powdered leather in this sheet is preferably 10 to 60% by weight.

(2) Injection-molded product:

L-LDPE (Linear Low-Density Polyethylene) and the powdered leather are mixed and stirred in an extruder to form a pellet. This pellet compound is predried and is then shaped into a moldings by injection molding. The content of the powdered leather in this molded product is preferably 10 to 50% by weight.

(3) Coating:

Two-liquid-type polyurethane is resolved or dispersed in a solvent to obtain a resin. The powdered leather is mixed with the resin and this mixture is then stirred to obtain a coating material. After its viscosity is adjusted, this coating material is applied over a substrate by a sprayer and is then dried to form a coating. The content of the powdered leather in this coating is preferably 5 to 60% by weight.

(4) Ink:

Ink is prepared in the same manner as that in the production of coating. After adjusted to a viscosity to be described in a screen printing specification, the ink is printed on a substrate. The content of the powdered leather in this ink layer as dried is preferably 5 to 60% by weight.

(5) Powder slush moldings:

A plastizer and vinyl chloride resin powder having a particle size of about 10 μm are smeared over vinyl chloride resin powder having a particle size of about 150 μm, and the powdered leather is additionally mixed to them. The resulting mixture is stirred at about 10° C., and is then placed in a template heated at about 240° C. A moldings is shaped as the mixture is melted by the wall surface of the template. The content of the powdered leather in this moldings is preferably 10 to 60% by weight.

II. Leather-like moldings:

This leather-like moldings is chiefly composed of a dispersed mixture comprising 1 to 90% by weight of the powdered leather of the invention and 99 to 10% by weight of at least one selected from the group consisting of synthetic resin and rubber.

Figure 3:
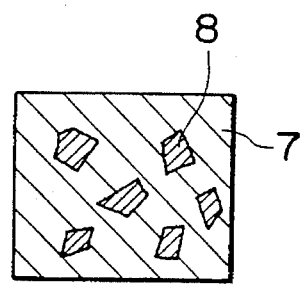
FIG. 3 is a cross-sectional view of a pellet-leather-like moldings.

The basic structure of this leather-like moldings is such that the powdered leather 8 is dispersed in synthetic resin and/or rubber 7, as shown in FIG. 3.

In the leather-like moldings, if the ratio of the powdered leather exceeds 90% by weight, such moldings becomes fragile. If the ratio of the powdered leather is less than 1% by weight, there is no effect by the powdered leather.

To the composition of this invention, additives, such as an oxidation retarder, a U. V. absorber, a processing assistant, a vulcanizer, a vulcanization promoting assistant and a curing agent, plasticizers, and coloring agents such as a dye and a pigment, may be added according to the purposes such as for modification and stabilization of the composition quality.

The processing assistant is exemplified by stearic acid, polyethylene glycol, paraffin wax and etc.

The vulcanizer is exemplified by sulphurs such as powder sulphur, insoluble sulphur and surface-processed sulphur, metal oxides such as magnesium oxide and zinc oxide (for CR, CSM and T), quinodic vulcanizer, peroxide vulcanizer, amine vulcanizer, resin vulcanizer, and organic sulphur vulcanizer.

The vulcanization promoting agent is examplified by dichiocarbamate or heterocyclic mercaptan.

The vulcanization promoting assistant exemplified by zinc white and STEARINSAN.

The method in which a leather-like product is manufactured using the foregoing materials will now be described in detail.

Figure 4:
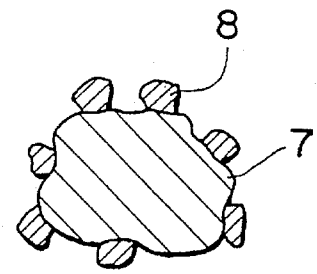
FIG. 4 is a cross-sectional view of a pulverulent-leather-like moldings.

For preventing bubbles and powder from being hydrolized when mixing the powdered leather with resin and rubber in pellet, powder, blocks or paste, the powdered leather having a water content of 0.5% by weight Is mixed and stirred with resin and/or rubber, and an additive, if necessary, by an extruder, a Banbury mixer or a mixing roll while heating at most 230° C. (temperature of material). Thus they are processed into a pellet form (FIG. 3), a powder form (FIG. 4) or a block form. Then for preventing the powdered leather in this pellet, powder or block from being hydrolized when molding by the absorbed water, the pellet, powder or block is predried at 90° to 120° C. For 5 to 12 hours or more. In this case, drying of the pellet or powder is such that the water content is at most 1% by weight. If it exceeds 1% by weight, the moldings becomes fragile, and silver streaks would occur on the surface of the moldings, resulting in a fault product. When the powdered leather in block is shaped into a moldings soon after mixing, the predrying step can be omitted. Finally, the predried pellet or powder is plasticized and is then attached or poured into the template according to a known molding method to obtain a moldings. The molding temperature (temperature of the material to be molded) is preferably at most 230° C.; if it exceeds 230° C., the powdered leather becomes resolved to reduce the strength of the moldings and emits an offensive odor. The adoptable typical molding methods are follow molding, compression molding, rotation molding, and powder slush molding.

Figure 5:
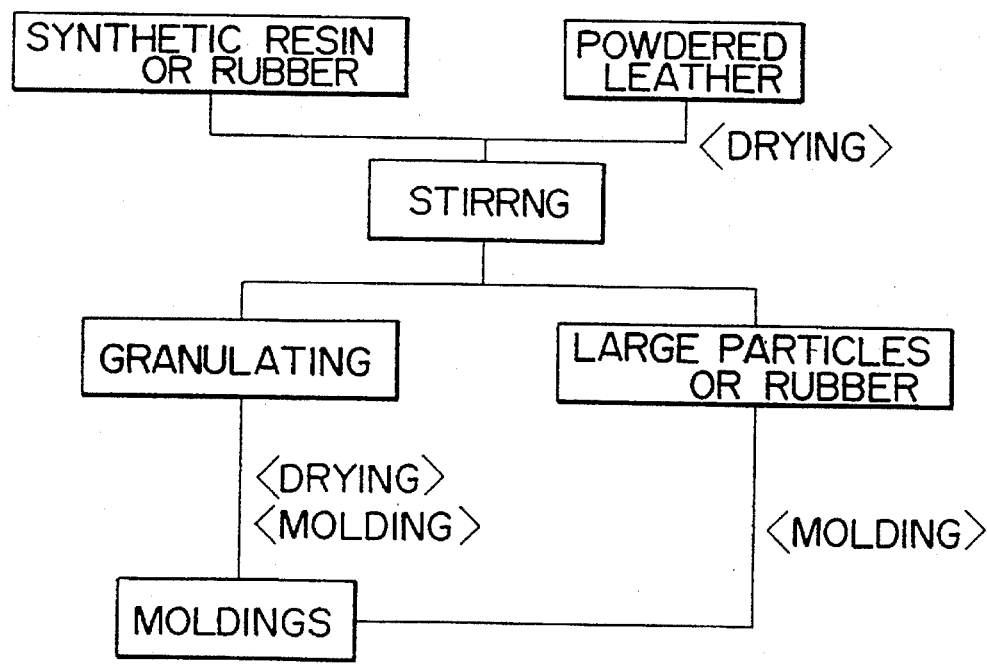
FIG. 5 is a flowchart showing the typical manner in which the leather-like moldings are manufactured.

The foregoing steps of production are shown in FIG. 5.

III. Film or sheet, containing powdered leather:

This film or sheet is composed of 1 to 90% by weight of powdered leather of this invention and 99 to 10% by weight of synthetic resin.

To the composition of this invention, additives such as fibers, oxidation retarder and U. V. absorber, processability improvers such as plasticizers, stabilizers and lubricants, and fillers, coloring agents such as dye and pigment may be added according to the purposes such as for stabilization of quality, and the environment in which the moldings is to be used.

The fibers are exemplified by natural fibers such as cotton, flax, silk and wool, and chemical fibers such as rayon, Cupra (cuprammonium artificial silk, e.x., from ASAHI chemical Co., Ltd. Japan), polyester, polyethylene, polypropylene, polyurethane, vinylon, acryl, nylon, acetate and polyvinyl chloride.

The processability improvers for vinyl chloride are exemplified by plasticizers such as dioctyl phthalate, dibutyl phthalate, tricreasyl phosphate and trioctyl phosphate, stabilizers such as tribasic lead sulfates, lead stearate and dibasi lead phosphites, and lubricants such as stearic acid, lead stearate and carnauba wax. The processability improvers for polyurethane are exemplified by solvents such as dimethylholmamide, methylethylketone and isopropylalcohol.

The fillers are exemplified by calcium carbonate, titanium white, clay and mica.

For production of a film or sheet containing the powdered leather of this invention, in order to prevent bubbles and powder from being hydrolized when preheating or mixing the powdered leather with resin and rubber in pellet, powder, blocks or paste is used, the powdered leather having a water content of 0.5% by weight is mixed and stirred with resin and/or rubber, and an additive, if necessary, while heating. Thus they are processed into a pellet or powder form, whereupon the pellet or powder compound is molded into a film or sheet. Alternatively, to manufacture a liquid composition before molding into such a film or sheet, resin and/or rubber is resolved or dispersed in an appropriate solvent, and then the powdered leather and, if necessary, an additive, are added to the resulting compound and are stirred and mixed therewith, whereupon the compound is molded into a film or sheet. In either case, the mixing ratio of the powdered leather to synthetic resin and/or rubber ranges from 1 to 90% by weight of the powdered leather with respect to 99 to 10% by weight of synthetic resin and/or rubber. If the amount of the powdered leather exceeds 90% by weight, the film or sheet becomes fragile; if the amount of the powdered leather is less than 1% by weight, there is no effect by the addition of the powdered leather. The content of the powdered leather in the synthetic resin is preferably 5 to 10% by weight in the case of film, and preferably 10 to 60% by weight in the case of sheet.

The thickness of the film or sheet is preferably at least 5 μm, and the powdered leather is preferably uniformly dispersed in the film or sheet. The powdered leather may be exposed to the surface of the film or sheet, improving the tactile quality and the touch of leather-like warmth.

The molding method is carried out such as by dry-type film fabrication, wet-type film fabrication, calender molding, inflation molding, T-die molding or press molding.

IV. Laminate:

In this laminate, the above-mentioned film or sheet is coated as a coating or laminated over a substrate directly or via an adhesive.

The surface of the laminate may be finished by, for example, buffing and embossing.

The substrate is exemplified by woven, a knitted or non-woven cloth of natural or artificial fibers, a synthetic resin film or sheet, a powdered-leather-containing film or sheet, and paper.

The laminating method using polyurethane resin is exemplified by a method in which the substrate is impregnated with a powdered-leather-containing resin solution, a wet-type method in which the above-mentioned resin solution is applied over the substrate, and a dry-type method in which a powdered-leather-containing film or sheet is formed from the above-mentioned solution and is then laminated over the substrate directly or via an adhesive. The laminating method using polyvinyl chloride is exemplified by a method in which a film or sheet is formed from a heated and melted powdered-leather-containing resin by extrusion molding or calender molding and is then laminated over the substrate that has previously coated with an adhesive and has been dried.

Figure 6:
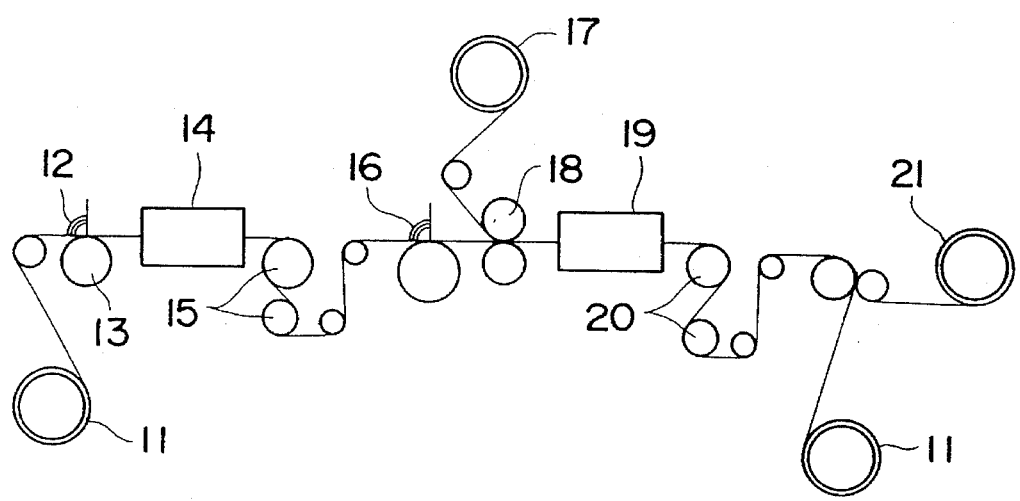
FIGS. 6 through 8 show a typical dry-type coating apparatus, a typical impregnation-type coating apparatus and a typical wet-type coating apparatus, respectively, for production of a laminate.
Figure 7:
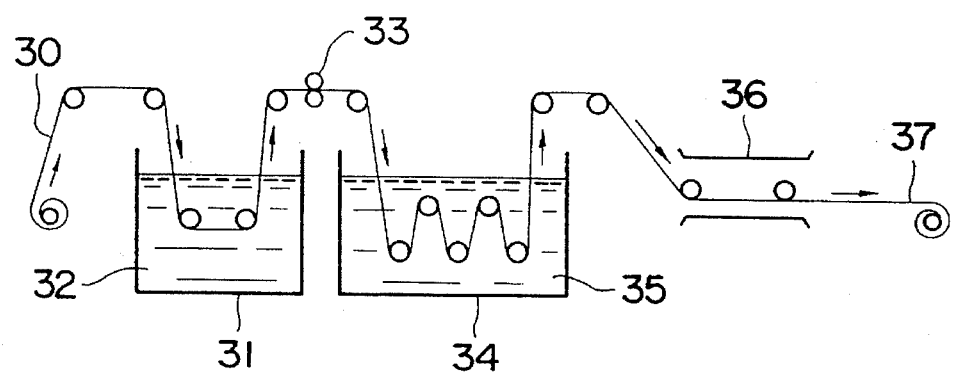
Figure 8:
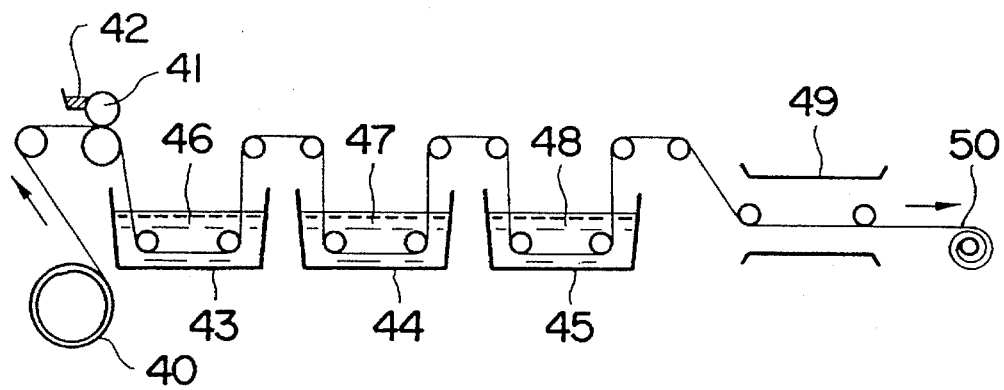

Typical laminating apparatuses for carrying out the foregoing laminating methods are shown in FIGS. 6 through 8.

FIG. 6 shows a dry-type coating apparatus in which a dry-type coating liquid 12 comprising a powdered-leather-containing resin solution is coated in a desired thickness over a separating-type paper 11 by a knife roll 13 and is dried in a drier 14 and then cooled by a cooling roll 15, thus obtaining a grain-leather-containing film or sheet. Then an adhesive 16 is applied to the surface of this film or sheet, whereupon the resultant film or sheet is laminated over a substrate 17 (impregnatable or non-impregnatable) supplied separately of the paper 11, is then dried by a drier 19 and is finally cooled by a cooling roll 20.

FIG. 7 shows an impregnation coating apparatus in which an impregnatable substrate 30 is introduced into an impregnation vessel 31 where an impregnation coating liquid 32 comprising a powdered-leather-containing solution is impregnated in the substrate 30. Subsequently, the excessive liquid on the substrate 30 is squeezed by a mangle 33, and the coated substrate 30 is then introduced into a solidifying and rinsing tank 34 where the coating liquid 32 is solidified and rinsed by water 35, whereupon the coated substrate 30 is finally dried by a drier 36. As a result, a laminate 37 has been obtained.

FIG. 8 shows a wet-type coating apparatus similar to the apparatus of FIG. 7. As shown in FIG. 8, a wet-type coating liquid 42 comprising a powdered-leather is coated over a substrate 40 by a coating roll 41, and the coated substrate 40 is introduced into solidifying and rinsing tanks 43, 44, and 45 one after another where the coated substrate 40 is solidified and rinsed by water 46, 47, and 48, whereupon the coated substrate 40 is dried by a drier 49. As a result, a laminate 50 has been obtained.

Figure 9:
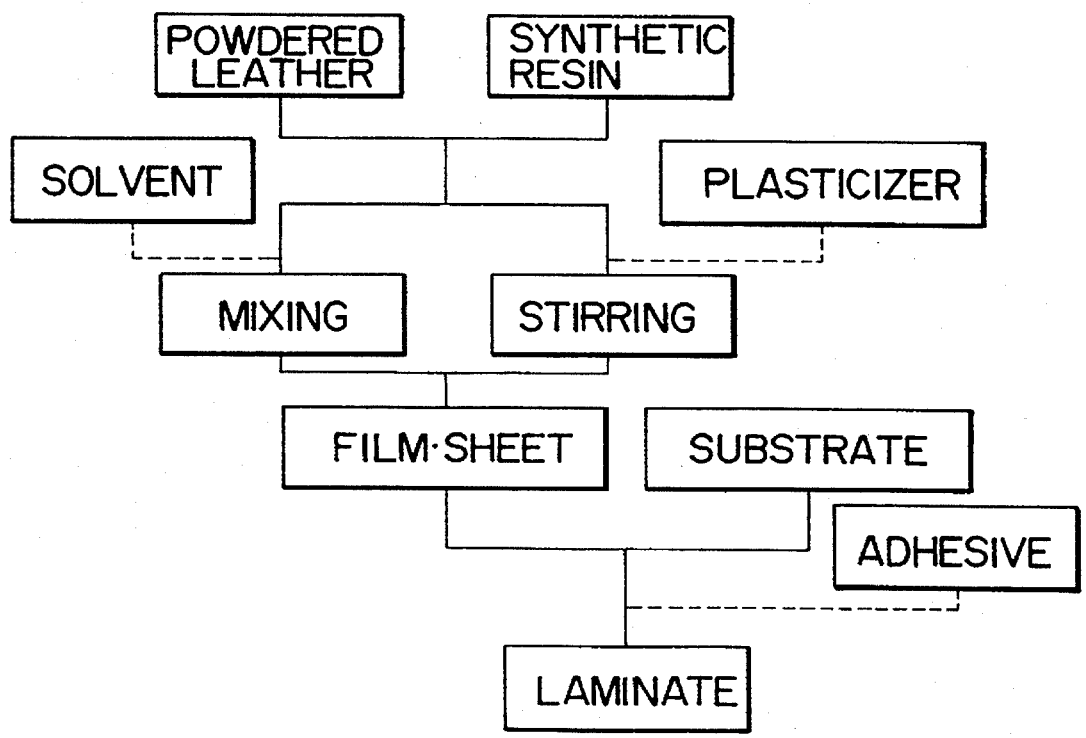
FIG. 9 is a flowchart showing the typical manner in which a powdered leather film or sheet and a powdered leather laminate are manufactured.

FIG. 9 is a flowchart schematically showing the manner in which the film or sheet and the laminate are produced according to this invention.

V. Leather-like grip cover:

This leather-like grip cover comprises a substrate, and a skin layer which chiefly consists of 5 to 60% by weight of the powdered leather and 95 to 40% by weight of synthetic resin and which is laminated over the substrate.

Figure 10:
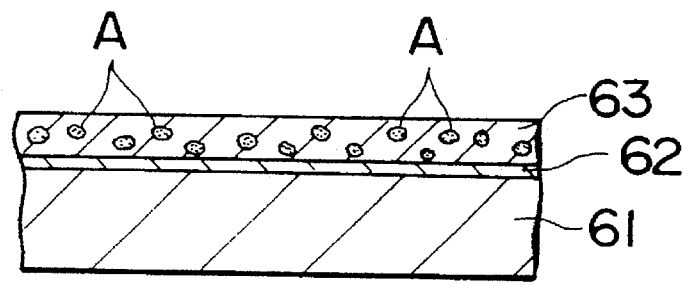
FIGS. 10 and 11 are cross-sectional views showing the respective definite structures of different leather-like grip covers.

Specifically, as shown in FIG. 10, a skin layer 63 is laminated over a substrate 61 via an adhesive 62.

The substrate Is exemplified by a woven, a knitted or non-woven cloth of natural or artificial fibers, a synthetic resin film or sheet, and non-woven cloth in which polyurethane a powdered-leather-containing film or sheet, and paper. Particularly if the substrate is a non-woven cloth in which polyurethane resin and the powdered leather are impregnated, it is possible to achieve the property and structure of an artificial leather which are similar to those of a natural leather. If the substrate is a non-woven cloth in which polyurethane resin and the powdered leather are impregnated, it is possible to achieve an artificial leather in which the powdered leather is contained not only in the skin layer but also in a fine porous resin intermediate layer described below, giving an improved degree of moisture absorbing property compared with a synthetic leather type in which the substrate is a woven or knitted cloth.

The laminating method for the leather-like grip cover is the same as that for the above-mentioned laminate.

Since the powdered leather is contained at least in the skin layer, this laminate structure of the leather-like grip cover can give a good touch as a grip material because of the moisture absorbing and discharging properties and the tactile quality.

In this leather-like grip cover, the skin layer may be fine porous. Alternatively, the grip cover may be provided with a fine porous resin intermediate layer between the substrate and the skin layer.

Figure 11:
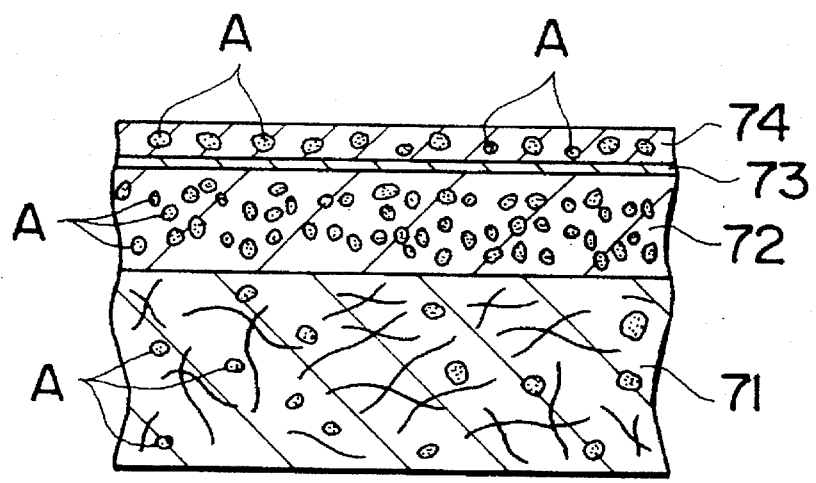

Specifically, as shown in FIG. 11, a fine porous resin intermediate layer 72 is formed on a substrate 71, and a skin layer 74 is laminated over the intermediate layer 72 via an adhesive 73.

For providing the skin layer with the fine and porous properties, inorganic substance such as a water-soluble high-molecular substance and salt, or an organic fine powder such as sugar is added to a mixture or solution for forming a skin layer. The resulting mixture is shaped into a film or sheet in or on the substrate, whereupon the film or sheet is rinsed with water or hot water to dissolve and remove the high-molecular substance in the film or sheet. Then the film or sheet is dewatered and dried. When a laminating method including the rinsing step such as shown In FIGS. 7 and 8 is utilized, a water-soluble high-molecular substance dissolving and removing step can be omitted. The water-soluble high-molecular substance powder may be fine powder of, for example, water-soluble collagen, starch or gelatin, having a particle size of at most 10 μm.

In order to provide a fine porous resin intermediate layer between the substrate and the skin layer, a solution containing the synthetic resin and the water-soluble high-molecular substance powder is coated over the non-impregnable substrate, and this laminate is rinsed and dried, as shown in FIGS. 7 and 8. To this synthetic resin solution, the powdered leather may be added. The synthetic resin is preferably polyurethane resin. With the resulting fine porous laminate having the fine porous skin layer, the moisture absorbing and emitting properties and the tactile quality, like the ordinary non-porous laminate, are maintained because of the powdered leather left after the water-soluble high-molecular substance is dissolved and removed. At the same time, a grain touch similar to pores of a human skin is given from the fine porous structure; but on the other hand, since there are many fine pores over the entire skin layer, this grip cover is relatively poor in both durability and smoothness compared with the non-porous laminate.

Figure 12:
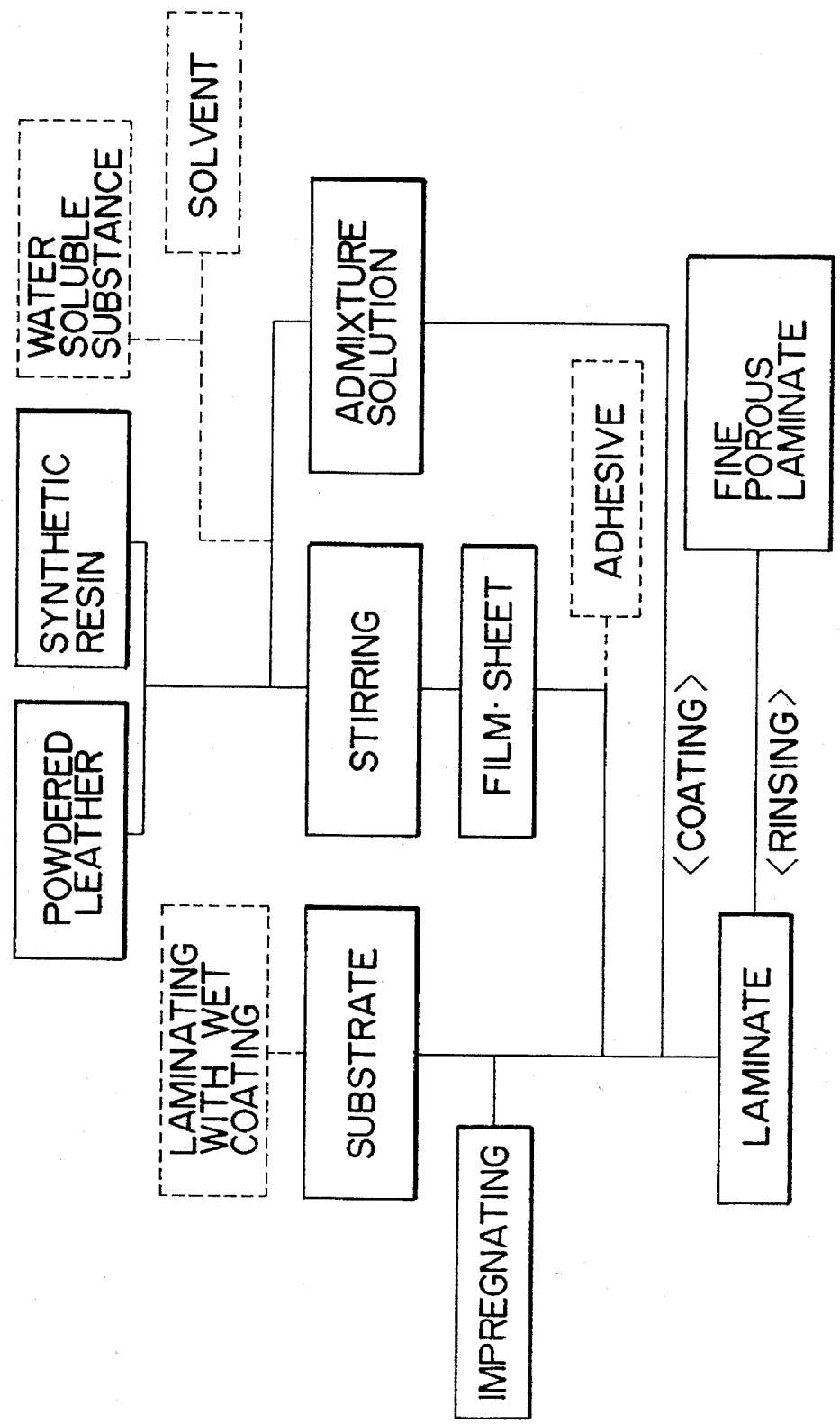
FIG. 12 is a flowchart showing the manner in which a laminate and a fine porous laminate are manufactured.

The typical method for producing the laminate and the fine porous laminate according to this invention is shown in the flowchart of FIG. 12.

Specifically, the substrate which is to be treated by the wet-type layer coating process is processed with wet-type impregnation. The film or sheet formed by mixing the powdered leather with synthetic resin is laminated over the substrate using an adhesive, if necessary. Or a mixture solution obtained by adding to the powdered leather and synthetic resin a water-soluble substance and a solvent, if necessary, whereupon the mixture solution is coated and laminated over the substrate to form a laminate. This laminate is rinsed to finally obtain a fine porous laminate.

EXAMPLES, powdered Leather and Method of Production Thereof.

Example 1

(Production of chrome-tanned and rinsed powdered leather of $D_{50} \leq 7$ μm)

A 1200 kg mass of chrome-tanned oxide leather shavings (leather shavings) was loosened into the original shavings (max: 1 cm wide×2 cm long) by a shredder (made by Hosokawa Micron Co., Ltd.) and was gradually supplied to a grinder (a hammer mill made by Odate Co., Ltd.: ability of 660 kg/hr) where the loosened leather shavings were ground into coarse particles having a particle size of at most about 10 mm. The water content of the coarse particle was 40 to 60% by weight.

Then, 350 kg of this wet coarse particles were introduced into a vacuum drier where they were dried until their water content was 20 to 30% by weight. Subsequently, 270 kg of the dried coarse particles were placed into a defatting machine where they were stirred for one hour and 15 minutes to perform elusion while n-hexane was being fed to them at a rate of 100 l/min, thus defatting. The defatted coarse particles were then filtered. The residual oil and fat in the defatted coarse particles was at most 0.5% by weight.

Subsequently, the residual solvent in this defatted coarse particles were purged by steam of 130° C. and 2 kg/cm²G until cease of the smell of the solvent (hexane).

To the same defatting machine, 2 m³ of water of room temperature were supplied, and stirring was performed for 30 minutes, whereupon dewatering is made by filtration. This batch-wise washing operation was performed repeated four times to elute the water-soluble portion and free ions such as metal ions. The coarse particles after filtration and draining had a water content of 65 to 70% by weight.

Then the resulting coarse particles were transferred without moisture-regulation to a steam-boiler where they were boiled for 45 minutes by steam of 130° C. and 2 kg/cm²G while stirring.

The steam-boiled coarse particles were predried for three hours, by a drier kept at 90° C., until they had a water content of 30 to 40% by weight, whereupon they were redried at 45° C. for eight hours by a vacuum drier to obtain 190 kg of the dried coarse particles having a water content of at most 1% by weight.

The thus obtained coarse particles were pulverized into fine particles for two hours by a Fine Victory Mill (made by Hosokawa Micron Co., Ltd.) rotating at 1700 rpm.

Subsequently, using a cyclone-type classifier, the fine particles were classified into 35 kg of fine powder having an average particle size $D_{50}$=about 30 μm and 155 kg of coarse powder having an average particle size $D_{50}$=about 60 μm. The coarse powder of $D_{50}$=about 60 μm was circulated to the pulverizing step.

Further, 35 kg of the fine particles of $D_{50}$=about 30 μm were repulverized under the conditions of air pressure 8 kg/cm²G, wind amount 10 m³/min and process amount 20 kg/hr by a jetmill(made by Seishin Enterprise Co., Ltd.) until $D_{50} \leq 7$ μm.

Finally, using a cyclone (made by Seishin Enterprise Co., Ltd.), this repulverized fine particles were classified to obtain 33.25 kg of ultra-fine powder of $D_{50} \leq 7$ μm and 1.75 kg of ultra-fine powder of $D_{50} \leq 2$ μm (in a bagfilter).

Example 2

(Production of aldehyde-tanned and rinsed powdered leather of $D_{50} \leq 7$ μm)

23.75 kg of ultra-fine powder of $D_{50} \leq 7$ μm were obtained by repeating the same method as Example 1, except using aldehyde-tanned oxide shavings (leather shavings) instead of the chrome-tanned oxide shavings, performing the batch washing operation twice (twice was enough because free ions to be eluted by rinsing were a very few), and using 25 kg of fine powder of $D^{50}$=about 30 μm in the repulverizing step. Since the aldehyde-tanned raw material was difficult to grind compared to the chrome-tanned raw material and hence the obtained amount of the fine powder of $D_{50}$=about 30 μm was only 25 kg, the amount of the aldehyde-tanned raw material to be used was reduced, compared to Example 1. The obtained amount of coarse powder of $D_{50}$=about 60 μm was 165 kg. The amount of ultrafine powder of $D_{50} \leq 2$ μm in the bagfilter.

Comparative Example 1

Chrome-tanned oxide shavings (same as the raw material in Example 1) were used without treating by any process.

Comparative Example 2

Aldehyde-tanned oxide shavings (same as the raw material in Example 2) were used without treating by any process.

Comparative Example 3

The steam-purged coarse powdered leather (chrome-tanned oxide shavings were used as the powdered leather raw material) was transferred, without any washing operation, to a boiler where water was supplied to the coarse particles to adjust the moisture until the water content was 65 to 70% by weight, and then the coarse particles were boiled. The repulverzing and subsequent steps were omitted. The same method as Example 1 was repeated except as discussed above, and as a result, coarse powder of $D_{50}$= about 60 μm and fine powder of $D_{50}$=about 30 μm were obtained.

Comparative Example 4

The steam-purged coarse powdered leather (aldehyde-tanned oxide shavings were used as the powdered leather raw material) was transferred, without any washing operation, to a boiler where water was supplied to the coarse particles to adjust the moisture until the water content was 65 to 70% by weight, and then the coarse particles were boiled. The repulverzing and subsequent steps were omitted. The same method as Example 2 was repeated except as discussed above, and as a result, coarse powder of $D_{50}$= about 60 μm and fine powder of $D_{50}$=about 30 μm were obtained.

Comparative Example 5

The fine powder of $D_{50}$=about 30 μm obtained in Comparative Example 3 was repulverized by a jet mill and was then classified by a cyclone, in the same manner as Example 1. As a result, fine power of $D_{50} \leq 7$ μm was obtained.

Comparative Example 6

The fine powder of $D_{50}$=about 30 μm obtained in Comparative Example 4 was repulverized by a jet mill and was then classified by a cyclone, in the same manner as Example 1. As a result, fine power of $D_{50} \leq 7$ μm was obtained.

The properties of the comparative particles are shown in Table 1. The distribution of particle size values of Table 1 is shown in detail in Table 2.

TABLE 1

| Property | Sample | | | | | | | |
|---|---|---|---|---|---|---|---|---|
| | Comparative Example 1 Chrome-tanned Shavings | Comparative Example 2 Aldehyde-tanned Shavings | Comparative Example 3 Chrome-tanned Unrinsed 30, 60 μm | Comparative Example 4 Aldehyde-tanned Unrinsed 30, 60 μm | Comparative Example 5 Chrome-tanned Unrinsed ≤7 μm | Comparative Example 6 Aldehyde-tanned Unrinsed ≤7 μm | Example 1 Chrome-tanned Rinsed ≤7 μm | Example 2 Aldehyde-tanned Rinsed ≤7 μm |
| Composition | | | | | | | | |
| Cortex (wt %) | 76 | 89.5 | 82 | 91 | 89.5 | 91 | 89 | 94 |
| Oil & fat (wt %) | 6.1 | 2.2 | 0.3 | 0.4 | 2.2 | 0.4 | 0.4 | 0.3 |
| Total ash Matter (wt %) | 12.9 | 3.8 | 13.2 | 3.6 | 3.8 | 3.6 | 5.4 | 2.0 |
| Sum of free ions $Na^+$, $Ca^{2+}$ to be eluted in Water (wt %) | 3.2 | 0.6 | 3.2 | 0.6 | 3.2 | 0.6 | 0.2 | 0.1> |
| Particle Size | | | | | | | | |
| Average Particle Size $D_{50}$ | — | — | $D_{50} = 27.0$ (σ = 8.9) | $D_{50} = 29.1$ (σ = 11.0) | $D_{50} = 6.0$ (σ = 2.0) | $D_{50} = 6.0$ (σ = 2.6) | $D_{50} = 5.7$ (σ = 1.6) | $D_{50} = 6.1$ (σ = 2.7) |

TABLE 1-continued

| Property | Comparative Example 1 Chrome-tanned Shavings | Comparative Example 2 Aldehyde-tanned Shavings | Comparative Example 3 Chrome-tanned Unrinsed 30, 60 μm | Comparative Example 4 Aldehyde-tanned Unrinsed 30, 60 μm | Comparative Example 5 Chrome-tanned Unrinsed ≦7 μm | Comparative Example 6 Aldehyde-tanned Unrinsed ≦7 μm | Example 1 Chrome-tanned Rinsed ≦7 μm | Example 2 Aldehyde-tanned Rinsed ≦7 μm |
|---|---|---|---|---|---|---|---|---|
| (Standard deviation σ) Unit: μm | | | $D_{50} = 52.3$ ($\sigma = 25.7$) | $D_{50} = 57.8$ ($\sigma = 20.1$) | | | | |
| Density g/cm³ | 0.048 | 0.040 | 0.465 ($D_{50} = 27.0$) 0.489 ($D_{50} = 52.3$) | 0.450 ($D_{50} = 29.1$) 0.474 ($D_{50} = 57.8$) | 0.413 | 0.390 | 0.413 | 0.391 |

Note 1: The figures concerning "Composition" in Table 1 represent values as analyzed after the compositions were dried.
Note 2: The composition and particle size were measured by the above-mentioned methods A), B) and C). The total gray matter was measured by a method according to JIS (Japanese Industrial Standard) 6550 "leather testing method" 6.3.

TABLE 2

| | Example 1 Chrome-tanned Rinsed | Example 2 Aldehyde-tanned Rinsed | Comparative Example 5 Chrome-tanned Unrinsed | Comparative Example 6 Aldehyde-tanned Unrinsed |
|---|---|---|---|---|
| Average grain Diameter $D_{50}$ | 5.7 μm | 6.1 μm | 6.0 μm | 6.0 μm |
| Standard Deviation σ | 1.6 μm | 2.7 μm | 2.0 μm | 2.6 μm |
| 0.500 (μm) | 0.0 (wt %) | 0.0 (wt %) | 0.0 (wt %) | 0.0 (wt %) |
| 0.630 | 0.0 | 0.0 | 0.0 | 0.0 |
| 0.791 | 0.0 | 0.0 | 0.0 | 0.0 |
| 1.00 | 0.0 | 0.0 | 0.0 | 0.2 |
| 1.26 | 0.0 | 0.2 | 0.2 | 0.7 |
| 1.59 | 0.2 | 0.8 | 0.6 | 2.2 |
| 2.00 | 0.6 | 2.2 | 2.3 | 3.8 |
| 2.52 | 2.6 | 4.7 | 5.4 | 5.5 |
| 3.17 | 9.2 | 9.2 | 7.8 | 9.2 |
| 4.00 | 21.3 | 16.1 | 14.6 | 14.0 |
| 5.04 | 31.3 | 20.4 | 25.8 | 20.0 |
| 6.35 | 27.7 | 20.3 | 33.8 | 26.8 |
| 8.00 | 6.4 | 15.2 | 8.9 | 13.1 |
| 10.1 | 0.7 | 6.7 | 0.2 | 3.0 |
| 12.7 | 0.0 | 4.2 | 0.4 | 1.5 |
| 16.0 | 0.0 | 0.0 | 0.0 | 0.0 |

| | Comparative Example 3 (I) Chrome-tanned Unrinsed | Comparative Example 4 (I) Aldehyde-tanned Unrinsed | Comparative Example 3 (II) Chrome-tanned Unrinsed | Comparative Example 4 (II) Aldehyde-tanned Unrinsed |
|---|---|---|---|---|
| Average particle Size $D_{50}$ | 27.0 μm | 29.1 μm | 52.3 μm | 57.8 μm |
| Standard Deviation σ | 8.9 μm | 11.0 μm | 25.7 μm | 20.1 μm |
| 4.00 (μm) | 0.0 (wt %) | 0.0 (wt %) | 0.0 (wt %) | 0.0 (wt %) |
| 5.04 | 0.0 | 0.0 | 0.0 | 0.0 |
| 6.35 | 0.2 | 0.1 | 0.0 | 0.0 |
| 8.00 | 0.6 | 0.2 | 0.7 | 0.0 |
| 10.1 | 1.9 | 0.8 | 1.4 | 0.1 |
| 12.7 | 5.3 | 2.6 | 2.4 | 0.2 |
| 16.0 | 12.7 | 8.0 | 3.9 | 0.4 |
| 20.2 | 21.3 | 20.1 | 5.4 | 1.0 |
| 25.4 | 28.6 | 31.4 | 7.4 | 3.5 |
| 32.0 | 22.7 | 23.7 | 11.4 | 9.8 |
| 40.3 | 6.3 | 7.3 | 14.9 | 19.7 |
| 50.8 | 0.1 | 2.5 | 19.1 | 27.2 |
| 64.0 | 0.2 | 1.3 | 23.2 | 23.8 |
| 80.6 | 0.0 | 1.1 | 8.2 | 10.8 |
| 102 | 0.0 | 0.9 | 2.0 | 3.5 |
| 128 | 0.0 | 0.0 | 0.0 | 0.0 |

Note: The measured values were obtained using a coal tar counter or Coal Tar Electronics Inc.

Test 1 (Coating) (chrome-tanned and rinsed powdered leather: $D_{50}$=5.7 μm, σ=1.6 μm)

20 parts by weight of the powdered leather obtained in Example 1, 80 parts by weight of the resin component of two-liquid-type polyurethane coating, and 100 parts by weight of thinner as a solvent were stirred and mixed. The resulting mixture was coated over an ABS resin moldings and was dried (the solvent was evaporated). A moisture-proof test conducted at 65° C. and 95%RH for 24 hours showed that this coated ABS resin moldings was found to be free from any white bled matter on the coating surface because water-soluble free ions in the powdered leather were few, and also showed that the surface condition was smooth and the tactile quality was good because the particle size of the powdered leather was small.

Test 2 (Coating) (aldehyde-tanned and rinsed powdered leather: $D_{50}$=6.1 μm, σ=2.7 μm)

20 parts by weight of the powdered leather obtained in Example 2, 80 parts by weight of the resin component of two-liquid-type polyurethane coating, and 100 parts by weight of thinner as a solvent were stirred and mixed. The resulting mixture was coated over an ABS resin moldings and was dried (the solvent was evaporated). A moisture-proof test conducted at 65° C. and 95%RH for 24 hours showed that this coated ABS resin moldings was found to be free from any white bled matter on the coating surface because water-soluble free ions in the powdered leather were few, and also showed that the surface condition was smooth and the tactile quality was good because the particle size of the powdered leather was small.

Test 3 (Leather) (chrome-tanned and rinsed powdered leather: $D_{50}$=5.7 μm, σ=1.6 μm)

The surface of vinyl chloride leather was finished with gravure using a mixture comprising 20 parts by weight of the powdered leather obtained in Example 1 and 80 parts by weight of vinyl chloride resin in emulsion. The resultant vinyl chloride leather was found free from any white bled matter on the leather surface because water-soluble free ions in the leather were few, even when water supply continued for four hours to keep the leather surface at 70° C. so as not to be dried. It also found that the surface condition was smooth and the tactile quality was good because the particle size of the powdered leather was small.

Test 4 (Leather) (chrome-tanned and rinsed powdered leather: $D_{50}=5.7$ μm, σ=1.6 μm)

20 parts by weight of the powdered leather obtained in Example 1, 80 parts by weight of polyurethane resin, and dimethylholmamide as a solvent were mixed and stirred to obtain a mixture. The surface of an artificial leather (or synthetic leather) was finished with gravure using this mixture. The resultant vinyl chloride leather was found free from any white bled matter on the leather surface because water-soluble free ions in the leather were few, even when water supply continued for four hours to keep the leather surface at 70° C. so as not to be dried. It also found that the surface condition was smooth and the tactile quality was good because the particle size of the powdered leather was small.

Comparative Test 1 (Coating) (chrome-tanned and rinsed powdered leather: $D_{50}=27.0$ μm, σ=8.9 μm)

20 parts by weight of the powdered leather obtained in Comparative Example 3, 80 parts by weight of the resin component of two-liquid-type polyurethane coating, and 100 parts by weight of thinner as a solvent were stirred and mixed. The resulting mixture was coated over an ABS resin moldings and was dried (the solvent was evaporated). A moisture-proof test conducted at 65° C. and 95%RH for 24 hours showed that this coated ABS resin moldings was found abnormal in appearance with white bled matter markedly coming out on the coating surface because water-soluble free ions in the powdered leather were many, and also showed that the surface condition was not smooth and the tactile quality was somewhat bad because the particle size of the powdered leather was large compared to Example 1. In the case of either coating or leather, when analyzing the white bled matter, $CaSO_4$, $Na_2SO_4$ and $NaCl$ crystals were observed. These crystals were proved to be the tanning agent and the like initially contained in the raw material shavings.

Comparative Test 2 (Coating) (aldehyde-tanned and unrinsed powdered leather: $D_{50}=29.1$ μm, σ=11.0 μm)

20 parts by weight of the powdered leather obtained in Comparative Example 4, 80 parts by weight of the resin component of two-liquid-type polyurethane coating, and 100 parts by weight of thinner as a solvent were stirred and mixed. The resulting mixture was coated over ABS resin moldings and was dried (the solvent was evaporated). A moisture-proof test conducted at 65° C. and 95%RH for 24 hours showed that this coated ABS resin moldings was found slightly messy in appearance with white bled matter which had not so remarkably come out on the coating surface because water-soluble free ions in the powdered leather were many, and also showed that the surface condition was not smooth and the tactile quality was somewhat bad because the particle size of the powdered leather was large compared to Example 1.

Comparative Test 3 (Coating) (chrome-tanned and unrinsed powdered leather: $D_{50}=52.3$ μm, σ=25.7 μm)

20 parts by weight of the powdered leather obtained in Comparative Example 3, 80 parts by weight of the resin component of two-liquid-type polyurethane coating, and 100 parts by weight of thinner as a solvent were stirred and mixed. The resulting mixture was coated over an ABS resin moldings and was dried (the solvent was evaporated). A moisture-proof test conducted at 65° C. and 95%RH for 24 hours showed that this coated ABS resin moldings was found abnormal in appearance with white bled matter which had remarkedly come out on the coating surface because water-soluble free ions in the powdered leather were many, and also showed that the surface condition was more than mattlike and the tactile quality was sandy because the particle size of the powdered leather was too large and felt badly compared with Example 1.

Comparative Test 4 (Coating) (aldehyde-tanned and unrinsed powdered leather: $D_{50}=57.8$ μm, σ=20.1 μm)

20 parts by weight of the powdered leather obtained in Comparative Example 4, 80 parts by weight of the resin component of two-liquid-type polyurethane coating, and 100 parts by weight of thinner as a solvent were stirred and mixed. The resulting mixture was coated over an ABS resin moldings and was dried (the solvent was evaporated). A moisture-proof test conducted at 65° C. and 95%RH for 24 hours showed that this coated ABS resin moldings was found abnormal in appearance with white bled matter which had markedly come out on the coating surface because water-soluble free ions in the powdered leather were not so many originally, and also showed that the surface condition was more than mattlike and the tactile quality was sandy because the particle size of the powdered leather was considerably large compared to Example 1.

Comparative Test 5 (Leather) (chrome-tanned and unrinsed powdered leather: $D_{50}=27.0$ μm, σ=8.9 μm)

The surface of vinyl chloride leather was finished with gravure using a mixture comprising 20 parts by weight of the powdered leather obtained in Comparative Example 3 and 80 parts by weight of vinyl chloride resin in emersion. The resultant vinyl chloride leather was found abnormal in appearance with white bled matter having come out on the leather surface because water-soluble free ions in the leather were many, even when water supply continued for four hours to keep the leather surface at 70° C. so as not to be dried. It also found that the surface condition was not very smooth and the tactile quality was somewhat bad because the particle size of the powdered leather was large, compared to Example 1.

Comparative Test 6 (Leather) (chrome-tanned and unrinsed powdered leather: $D_{50}=27.0$ μm σ=8.9 μm)

The surface of artificial leather was finished with gravure using a mixture comprising 20 parts by weight of the powdered leather obtained in Comparative Example 3 and 80 parts by weight of vinyl chloride resin in emersion. The resultant artificial leather was found abnormal in appearance with white bled matter having come out on the leather surface because water-soluble free ions in the leather were many, even when water supply continued for four hours to keep the leather surface at 70° C. so as not to be dried. It also found that the surface condition was not so smooth and the tactile quality was somewhat bad because the particle size of the powdered leather was large, compared to Example 1.

Comparative Test 7 (Coating) (chrome-tanned and unrinsed powdered leather: $D_{50}$=6.0 μm, σ=2.0 μm)

20 parts by weight of the powdered leather obtained in Comparative Example 5, 80 parts by weight of the resin component of two-liquid-type polyurethane coating, and 100 parts by weight of thinner as a solvent were stirred and mixed. The resulting mixture was coated over an ABS resin moldings and was dried (the solvent was evaporated). A moisture-proof test conducted at 65° C. and 95%RH for 24 hours showed that this coated ABS resin moldings was found abnormal in appearance with white bled matter remarkably having come out on the coating surface because water-soluble free ions in the powdered leather were many, and also showed that the surface condition was smooth and the tactile quality was good because the particle size of the powdered leather was as large as that of Example 1.

Comparative Test 8 (Coating) (aldehyde-tanned and unrinsed powdered leather: $D_{50}$=6.0 μm, σ=2.6 μm)

20 parts by weight of the powdered leather obtained in Comparative Example 6, 80 parts by weight of the resin component of two-liquid-type polyurethane coating, and 100 parts by weight of thinner as a solvent were stirred and mixed. The resulting mixture was coated over an ABS resin moldings and was dried (the solvent was evaporated). A moisture-proof test conducted at 65° C. and 95%RH for 24 hours showed that this coated ABS resin moldings was found abnormal in appearance with white bled matter having markedly come out on the coating surface because water-soluble free ions in the powdered leather were less originally, and also showed that the surface condition was smooth and the tactile quality was good because the particle size of the powdered leather was as large as that of Example 1.

The detailed results of the Tests and the Comparative Tests are shown in Table 3.

TABLE 3

| | Kind of Powdered Leather | Sum of free ions in Powdered Leather ($Na^+$, $Ca^{2+}$) (wt %) | Presence/absence Of bled matter | Condition of Surface, Tactle Quality |
|---|---|---|---|---|
| Test 1 (Coating) | Example 1 Rinsed $D_{50}$ = 5.7 μm (Chrome-tanned) | 0.2 | Absence ○ | Good ○ |
| Test 2 (Coating) | Example 2 Rinsed $D_{50}$ = 6.1 μm (Aldehyde-tanned) | 0.1> | Absence ○ | Good ○ |
| Test 3 (Leather) | Example 1 Rinsed $D_{50}$ = 5.6 μm (Chrome-tanned) | 0.2 | Absence ○ | Good ○ |
| Test 4 (Leather) | Example 1 Rinsed $D_{50}$ = 5.6 μm (Chrome-tanned) | 0.2 | Absence ○ | Good ○ |
| Comparative Test 1 (Coating) | Comparative Example 3 (I) Unrinsed $D_{50}$ = 27.0 μm (Chrome-tanned) | 3.2 | Presence x | Somewhat bad Δ |
| Comparative Test 2 (Coating) | Comparative Example 4 (I) Unrinsed $D_{50}$ = 29.1 μm (Aldehyde-tanned) | 0.6 | Presence Δ | Somewhat bad Δ |
| Comparative Test 3 (Coating) | Comparative Example 3 (II) Unrinsed $D_{50}$ = 52.3 μm (Chrome-tanned) | 3.2 | Presence x | Bad x |
| Comparative Test 4 (Coating) | Comparative Example 4 (II) Unrinsed $D_{50}$ = 57.8 μm (Aldehyde-tanned) | 0.6 | Presence Δ | Bad x |
| Comparative Test 5 (Leather) | Comparative Example 3 (I) Unrinsed $D_{50}$ = 27.0 μm (Chrome-tanned) | 3.2 | Presence x | Somewhat bad Δ |
| Comaprative Test 6 (Leather) | Comparative Example 3 (I) Unrinsed $D_{50}$ = 27.0 μm (Chrome-tanned) | 3.2 | Presence x | Somewhat bad Δ |
| Comparative Test 7 (Coating) | Comparative Example 5 Unrinsed $D_{50}$ = 6.0 μm (Chrome-tanned) | 3.2 | Presence x | Good ○ |
| Comparative Test 8 (Coating) | Comparative Example 6 Unrinsed $D_{50}$ = 6.0 μm (Aldehyde-tanned) | 0.6 | Presence Δ | Good ○ |

Note 1: ○, Δ and x regarding the presence/absence of bled matter represent different degrees of bleeding; specifically, ○ means "there existed no bled matter", Δ means "there existed a small amount of bled matter", and x means "there existed a large amount of bled matter".
Note 2: ○, Δ and x regarding the condition of surface or the tactile quality represents different degrees of smoothness or roughness of the product surface; ○ means "good condition", Δ means "somewhat bad condition", and x means "bad condition".

powdered-Leather-Containing Composition

Example 3

By the same method as that of Example 1, ultra-fine powdered leather of $D_{50}$≦7 μm (hereinafter called "powdered leather A") was obtained.

Then, 30% by weight of the powdered leather A and 70% by weight of solid part of polyurethane solution (LEATHERMIN ME-3612LP, trade name, manufactured by Dainichi Seika Co., Ltd.) for synthetic leather were mixed together to obtain a mixture. This mixture was applied as a coating over a separating-type paper by a coating roll and was dried, thus obtaining a film.

Example 4

A film was obtained by the same method as Example 3, except that 70% by weight of the powdered leather A and 30% by weight of solid part of polyurethane solution.

Example 5

30% by weight of the powdered leather A and 70% by weight of L-LDPE (linear Low-density polyethylene, MORETEC 1018T, trade name, manufactured by Idemitsu Petrochemical Co., Ltd.) were mixed together to obtain a mixture. This mixture was heated and kneaded at 170° C., whereupon the resulting mixture was extruded into a pellet. A moldings was produced from the pellet by injection molding.

Example 6

30% by weight of the powdered A and 70% by weight of EPDM (ethylene-propylene-diene-methylene-linkage, KELTAN IS-50A, trade name, manufactured by Idemitsu DSM Co., Ltd.) were mixed together to obtain a mixture. 1.5 parts by weight of vulcanizer were added to 100 parts by weight of the mixture, and the resulting compound was kneaded by a roll having a surface temperature of 40° to 60° C. A press moldings was obtained from the kneaded compound by press molding.

Example 7

30% by weight of the powdered leather and 70% by weight of resin part of two-liquid-type polyurethane paint, for forming a coating having a Young coefficient of 350 to 500 MPa, were mixed together to obtain a mixture. A solvent was added to the mixture to obtain a powdered-leather-containing paint. This paint was applied over an ABS resin moldings and was dried to form a coating.

Example 8

30 μ by weight of the powdered leather, 50% by weight of non-volatile matter and 70% by weight of the resin component of two-liquid-type polyurethane adhesive having a viscosity of 200 to 400 poise were mixed to obtain a mixture. A solvent was added to the mixture to obtain a powdered-leather-containing adhesive. Using this adhesive, a plain-weave cotton cloth and a polyurethane film having a thickness of 30 μm and a moisture permeability of 1000 g/m$^2$·24 hr were joined together so as to have a thickness of about 10 μm when dried.

Comparative Example 7

The steam-purged coarse powdered leather (chrome-tanned oxide shavings were used as the powdered leather raw material) was transferred, without any washing operation, to a boiler where water was supplied to the coarse particles to adjust the moisture until the water content was 65 to 70% by weight, and then the coarse particles were boiled. The same method as Example 1 was repeated except as discussed above, and as a result ultra-fine powdered leather of $D_{50} \leq 7$ μm (hereinafter called "powdered leather B") was obtained. The properties of the powdered leather B are shown hereinafter in Table 4.

Then, using the powdered leather B instead of the powdered leather A, a film was manufactured in the same manner as Example 1.

Comparative Example 8

A film was manufactured in the same film producing method as Example 2, except that the powdered leather B obtained in Comparative Example 7 was used instead of the powdered leather A.

Comparative Example 9

A moldings was manufactured in the same moldings producing method as Example 5, except that the powdered leather B obtained in Comparative Example 7 was used instead of the powdered leather A.

Comparative Example 10

A moldings was manufactured in the same moldings producing method as Example 6, except that the powdered leather B obtained in Comparative Example 7 was used instead of the powdered leather A.

Comparative Example 11

A coating was manufactured in the same coating producing method as Example 7, except that the powdered leather B obtained in Comparative Example 7 was used instead of the powdered leather A.

Comparative Example 12

A polyurethane film and a plain-weave cotton cloth were attached to each other in the same attaching method as Example 8, except that only the polyurethane film was used, without using the powdered leather A.

Comparative Example 13

A film was manufactured in the same film producing method as Example 3, except that the powdered leather A was not used and only LEATHERMIN ME-3612LP, trade name, was used. The tactile quality of this film was not dry and smooth.

Comparative Example 14

A film was manufactured in the same film producing method as Example 3, except that the blending ratio of the powdered leather A and the solid part of LEATHERMIN ME-3612LP, trade name was changed to 95% by weight and 5% by weight respectively. This film was very fragile and was not usable.

Comparative Example 15

A coating was manufactured in the same coating forming method as Example 7, except that the powdered leather A was not used and only two-liquid-type polyurethane paint was used. The tactile quality of this coating was moist and not dry.

Comparative Example 16

A coating was manufactured in the same coating forming method as Example 7, except that the blending ratio of the powdered leather A and the resin component of two-liquid-type polyurethane paint was changed to 95% by weight and 5% by weight, respectively. This coating was very fragile and was easily broken as scratched such as by a nail, and was therefore not usable.

The test results of the compositions used in the foregoing Examples and Comparative Examples and of their composition properties are shown Table 5. The results in Table 5 were obtained by the following property test methods:

(1) Moisture-proof test at 30° C. and 95%RH:

Pure water drops were fallen onto the surface of a sample, and the sample was left in a predetermined atmosphere for 24 hours, whereupon the sample surface was examined.

(2) Moisture permeability test:

This test was conducted according to JIS L1099A-1.

TABLE 4

|  | Powdered Leather B |
|---|---|
| Powedery principal Composition (wt %) |  |
| Hide component | 82 |
| Oil & fat component | 0.3 |
| Sum of free ions $Na^+$, $Ca^{2+}$ to be Extracted in water | 3.2 |
| Average particle size $D_{50}$ (μm) | 6.0 |
| Standard deviation σ (μm) | 2.0 |
| *0.500 (μm) | 0.0 (wt %) |
| 0.630 | 0.0 |
| 0.791 | 0.0 |
| 1.00 | 0.0 |
| 1.26 | 0.2 |
| 1.59 | 0.6 |
| 2.00 | 2.3 |
| 2.52 | 5.4 |
| 3.17 | 7.8 |
| 4.00 | 14.6 |
| 5.04 | 25.8 |
| 6.35 | 33.8 |
| 8.00 | 8.9 |
| 10.1 | 0.2 |
| 12.7 | 0.4 |
| 16.0 | 0.0 |
| Density (g/cm³) | 0.411 |

|  | Powdered Leather C |
|---|---|
| Powedery principal Composition (wt %) |  |
| Hide component | 89 |
| Oil & fat component | 0.4 |
| Sum of free ions $Na^+$, $Ca^{2+}$ to be Extracted in water | 0.2 |
| Average particle size $D_{50}$ (μm) | 27.0 |
| Standard deviation σ (μm) | 8.9 |
| *4.00 (μm) | 0.0 (wt %) |
| 5.04 | 0.0 |
| 6.35 | 0.2 |
| 8.00 | 0.6 |
| 10.1 | 1.9 |
| 12.7 | 5.3 |
| 16.0 | 12.7 |
| 20.2 | 21.4 |
| 25.4 | 28.6 |
| 32.0 | 22.7 |
| 40.3 | 6.3 |
| 50.8 | 0.1 |
| 64.0 | 0.2 |
| 80.6 | 0.0 |
| 102 | 0.0 |
| 128 | 0.0 |
| Density (g/cm³) | 0.462 |

The measured value with symbol * was obtained using a coal tar counter of Coal Tar Electronics Inc.

TABLE 5

| | Synthetic resin or rubber wt % | | | | | Powdered Leather wt % | | Composition property test results | | | | |
|---|---|---|---|---|---|---|---|---|---|---|---|---|
| | Thermo- plastic Resin | Solid matter in liquid Polyurethane | | | Rubber | Pow- dered | Pow- dered | | | Coating Film | | |
| | MORETEC 1018T | LEATHERMIN ME-3612LP | Coat- ing | Adhe- sive | KELTAN 1S-50A | Leather A | Leather B | 1 | 2 | Tactile Quality | 3 | 5 |
| Example 3 | — | 70 | — | — | — | 30 | — | No | 1700 | — | — | — |
| Example 4 | — | 30 | — | — | — | 70 | — | No | 4200 | — | — | — |
| Example 5 | 70 | — | — | — | — | 30 | — | No | — | — | — | — |
| Example 6 | — | — | — | — | 70 | 30 | — | No | — | — | — | — |
| Example 7 | — | — | 70 | — | — | 30 | — | No | — | Good | Good | — |
| Example 8 | — | — | — | 70 | — | 30 | — | — | — | — | — | 820 |
| Com. Ex. 7 | — | 70 | — | — | — | — | 30 | Yes | 1700 | — | — | — |
| Com. Ex. 8 | — | 30 | — | — | — | — | 70 | Yes | 4100 | — | — | — |
| Com. Ex. 9 | 70 | 30 | — | — | — | — | 30 | Yes | — | — | — | — |
| Com. Ex. 10 | — | — | — | — | 70 | — | 30 | Yes | — | — | — | — |
| Com. Ex. 11 | — | — | 70 | — | — | — | 30 | Yes | — | Good | Good | — |
| Com. Ex. 12 | — | — | — | 100 | — | — | — | — | — | — | — | 480 |
| Com. Ex. 13 | — | 100 | — | — | — | — | — | No | 1000 | — | — | — |
| Com. Ex. 14 | — | 5 | — | — | — | — | 95 | Yes | 5300 | — | — | — |
| Com. Ex. 15 | — | — | 100 | — | — | — | — | No | — | Bad | Good | — |
| Com. Ex. 16 | — | — | — | 5 | — | — | 95 | Yes | — | 4 | Bad | — |

TABLE 5-continued

| | Synthetic resin or rubber wt % | | | | Powdered Leather wt % | | Composition property test results | | | | |
|---|---|---|---|---|---|---|---|---|---|---|---|
| Thermo-plastic Resin | Solid matter in liquid Polyurethane | | | Rubber | Pow-dered | Pow-dered | Coating Film | | | | |
| MORETEC 1018T | LEATHERMIN ME-3612LP | Coat-ing | Adhe-sive | KELTAN 1S-50A | Leather A | Leather B | 1 | 2 | Tactile Quality | 3 | 5 |

Com. Ex.: Comparative Example
1: Whether surface became white and powdery under moisture-proof test conducted for 24 hr at 30° C. and 95% RH
2: Moisture permeability of urethane film (30 μm) g/m² · 24 hr
3: Strength
4: Partly bad and partly good
5: Moisture permeability of laminated synthetic leather using adhesive g/m² · 24 hr Powdered-Leather-Containing Film or Sheet, and Laminate Example 9 (powdered-leather-containing film)

By the same method as that of Example 1, ultra-fine powdered leather of $D_{50} \leq 7$ μm (hereinafter called "powdered leather A") was obtained.

Then, 10% by weight of the powdered leather A and 90% by weight of solid part of polyurethane solution (LEATHERMIN ME3612LP, trade name, manufactured by Dainichi Seika Co., Ltd.) for synthetic leather were mixed together to obtain a resin solution (20% by weight of resin solid). This resin solution was applied as a coating over a separating-type paper by a coating roll and was dried at 70° C., thus obtaining a film having a thickness of 30 μm.

Example 10 (powdered-leather-containing film)

A film was manufactured in the same film producing method as Example 9, except that 30% by weight of the dried powdered leather A and 70% by weight of the solid part of polyurethane solution were mixed together.

Example 11 (powdered-leather-containing film)

A film was manufactured in the same film producing method as Example 14, except that 50% by weight of the dried powdered leather A and 50% by weight of the solid part of polyurethane solution were mixed together.

Example 12

20% by weight of the powdered leather A and 80% by weight of soft vinyl chloride resin (made by Shinetsu Polymer Co. Ltd., containing 38% by weight of a plasticizer and having an average polymerization grade of 3000) were mixed together to obtain a mixture. This mixture was heated and kneaded, whereupon the resulting mixture was extruded into a pellet. This pellet was shaped into a sheet having a thickness of 400 μm by a press molding machine.

Example 13 (Dry-type synthetic leather)

A small amount of assistant was added to a dry-type polyurethane resin solution into which 6% by weight of the solid part of the dried powdered leather A was blended. Using the dry-type coating apparatus of FIG. 6, the resulting solution as a dry-type coating liquid was applied over a separating-type paper and was dried at 130° C. to form a powdered-leather-containing polyurethane film having a thickness of 20 μm. Using a polyurethane adhesive to which 5% by weight of the solid part of the dried powdered leather A was blended, the polyurethane film was attached to a substrate comprising a polyester non-woven cloth of 1 denier and 70 g/m² grammage. This coated cloth was dried at 140° C. to form a dry-type synthetic leather having a powdered-leather-containing polyurethane resin layer of a 40 μm thickness.

Example 14 (Wet-type synthetic leather)

A wet-type coating liquid was prepared by adding a small amount of filler to a wet-type polyurethane resin solution to which 30% by weight of the solid part of the dried powdered leather A was blended. Using the wet-type coating apparatus of FIG. 8, this coating liquid was applied to a substrate comprising a woven cloth of mixed fibers including 50% of nylon and 50% of Tetron (trade name for polyethylene terephthalate). The coated substrated was dried at 140° C. As a result, a wet-type synthetic leather having a powdered-leather-containing ester polyurethane resin layer of 0.7 mm thickness was obtained.

Example 15 (Artificial leather)

3 parts of filler was added to an ester polyurethane resin solution (15% by weight of resin solid) to which 25% by weight of the solid part of the dried powdered leather A was blended. Using the impregnable coating apparatus, this resultant solution as an impregnable coating liquid was impregnated into a substrate comprising a polyester non-woven cloth of 2 denier and 70 g/m² grammage, by dry weight of 30 g /m². This impregnated substrate was dried at 130° C.

Then, to obtain a wet-type coating liquid, the filler same as described above and a foaming agent were added to an ester polyurethane resin solution (15% by weight of resin solid) to which 30% by weight of the solid part of the dried powdered leather A was blended. Using the wet-type coating apparatus of FIG. 8, this coating liquid was applied over the impregnated substrate. The coated substrate was dried at 130° C. As a result, an artificial leather having a porous polyurethane resin layer of 0.4 mm thickness was obtained.

Comparative Example 17

A film was manufactured in the same film producing method as Example 9, except that the powdered leather A was not used.

Comparative Example 18 powdered leather B was manufactured in the same method as Comparative Example 7.

Then, a film was manufactured in the same film producing method as Example 9, except that the powdered leather B was used instead of the powdered leather A.

Comparative Example 19

Powdered leather C ($D_{50}$ is about 30 μm) was manufactured in the same method as Example 1, excepting no-circulation to the pulverizing step.

Then, a film was manufactured in the same film producing method as Example 9, except that the powdered leather C was used instead of the powdered leather A.

Comparative Examples 20–23

A sheet or laminate was manufactured in the same method as Examples 12–15, except that the powdered leather A was not used.

The properties, such as the degree of moisture permeation and the amount of moisture absorption, of the film, sheet and laminate obtained as discussed above were tested. The test results are shown in Table 6 and Table 7. The values in Tables 6 and 7 were obtained in the following test methods:

(1) Degree of moisture permeation:
The test was conducted according to JIS K6549.

(2) Amount of moisture absorption:
The one surface (in the case of a single layer, either surface, and in the case of two or more layers, the surface opposite to the substrate) may be of a sample which became balanced at 23° C. and 30%RH was placed in the environment of 23° C. and 80%RH. At that time, any increase of weight of the sample was measured.

(3) Amount of moisture emission:
The one surface (cotton used in measurement was the same as in the case of measurement of the amount of moisture absorption) was placed in the environment of 23° C., 30%RH, whereupon any reduction of weight of the sample was measured.

(4) Tactile quality:
Comparison was made by touching the surface by hand.

(5) Moisture-proof test:
The sample was exposed to the environment of 30° C. and 95% RH, whereupon any change of the sample surface was observed.

TABLE 6

| | Powdered Leather wt % | Moisture Permeability g/m² · 24 Hr | Absorbed Water g/m² 2 Hr | Tactile Quality of Surface | Surface after Moisture-proof Test |
|---|---|---|---|---|---|
| Example 9 | 10 | 1300 | 0.4 | — | — |
| Com. Ex. 17 | 0 | 900 | 0.2 | — | — |
| Example 10 | 30 | 1700 | 0.7 | Good | No change |
| Com. Ex. 18 | 30 | 1700 | 0.7 | — | White powdely Bleed |
| Com. Ex. 19 | 30 | 1600 | 0.7 | Feels too Rough | — |
| Example 11 | 50 | 3200 | 0.9 | — | — |

Com. Ex.: Comparative Example

TABLE 7

| | Absorbed water g/m² | | | Emitted water g/m² | | |
|---|---|---|---|---|---|---|
| | ⅓ Hr | 1 Hr | 24 Hr | ⅓ Hr | 1 Hr | 24 Hr |
| Example 12 | 1.2 | 2.4 | 13.5 | 1.0 | 2.2 | 4.0 |
| Com. Ex. 20 | 0.3 | 0.6 | 2.0 | 0.3 | 0.7 | 1.0 |
| Example 13 | 2.5 | 3.5 | 5.0 | 1.9 | 3.0 | 4.3 |
| Com. Ex. 21 | 1.2 | 1.6 | 2.5 | 0.8 | 1.2 | 1.9 |
| Example 14 | 13.0 | 15.5 | 22.0 | 12.1 | 15.0 | 21.9 |
| Com. Ex. 22 | 8.0 | 10.0 | 12.0 | 7.0 | 9.0 | 11.5 |
| Example 15 | 9.7 | 10.4 | 13.0 | 8.0 | 10.3 | 13.0 |
| Com. Ex. 23 | 3.0 | 4.0 | 5.5 | 2.8 | 3.9 | 5.4 |

Com. Ex.: Comparative Example

What is claimed is:

1. A powdered leather which is composed of at least 85% by weight of cortex, at most 2% by weight of oil and fat, and at most 0.5% by weight of $Na^+$ and $Ca^{2+}$ ions capable of being eluted by water and which has an average particle size of at most 7 μm, a standard deviation of said average particle size being at most 3 μm.

2. A finished product comprising:
   (a) from 90 to 1% by weight of a powdered leather which is composed of at least 85% by weight of cortex, at most 2% by weight of oil and fat, and at most 0.5% by weight of sum of free ions $Na^+$ and $Ca^{2+}$ capable of being eluted in water and which has an average particle size of at most 7 μm, a standard deviation of said average particle size being at most 3 μm; and
   (b) 10 to 99% by weight of synthetic resin.

3. A finished product according to claim 2, wherein said finished product is in the form of a film or sheet.

4. A finished product according to claim 2, additionally comprising a substrate, said powdered leather and synthetic resin being in the form of a film or sheet coated over said substrate to provide a laminate.

* * * * *